United States Patent [19]

Kuramatsu

[11] Patent Number: 5,526,379
[45] Date of Patent: Jun. 11, 1996

[54] METHOD OF SELECTING THE MOST DESIRABLE CODE SEARCH MODE IN A PAGER IN THE CASE OF FRAME ASYNC

[75] Inventor: Hiroyasu Kuramatsu, Tokyo, Japan

[73] Assignee: NEC Corporation, Tokyo, Japan

[21] Appl. No.: 145,606

[22] Filed: Nov. 4, 1993

[30] Foreign Application Priority Data

Nov. 4, 1992 [JP] Japan .................................. 4-295023

[51] Int. Cl.$^6$ ................................. H04L 7/00; H04J 3/06
[52] U.S. Cl. ........................ 375/368; 375/354; 340/825; 370/105.1
[58] Field of Search ................................ 375/354, 357, 375/362, 367, 371, 376, 368; 370/105.1, 105.3, 105.5; 340/825.44, 825.20, 311.1, 825.0–825.57

[56] References Cited

U.S. PATENT DOCUMENTS

| | | | |
|---|---|---|---|
| 3,836,726 | 9/1974 | Wells et al. | 379/57 |
| 4,451,916 | 5/1984 | Casper et al. | 375/4 |
| 4,518,961 | 5/1985 | Davis et al. | 340/825.44 |
| 4,663,623 | 5/1987 | Lax et al. | 340/825.44 |
| 4,818,987 | 4/1989 | Ide et al. | 340/825.47 |
| 4,829,466 | 5/1989 | Davis et al. | 340/311.1 |
| 5,005,013 | 4/1991 | Tsukamoto et al. | 340/825.44 |
| 5,148,160 | 9/1992 | Kudoh | 340/825.44 |
| 5,208,833 | 5/1993 | Erhart et al. | 375/20 |
| 5,257,019 | 10/1993 | Schwendeman | 340/825.49 |
| 5,309,154 | 5/1994 | Mun et al. | 340/825.44 |
| 5,325,088 | 6/1994 | Willard et al. | 340/825.2 |
| 5,440,298 | 8/1995 | Kuramatsu | 340/825.44 |

FOREIGN PATENT DOCUMENTS

| | | |
|---|---|---|
| 0482632 | 4/1992 | European Pat. Off. . |
| 2144565 | 3/1985 | United Kingdom . |

*Primary Examiner*—Edward L. Coles, Sr.
*Assistant Examiner*—Madeleine Anh-Vinh Nguyen
*Attorney, Agent, or Firm*—Sughrue, Mion, Zinn, Macpeak & Seas

[57] ABSTRACT

In the event that a radio pager falls into frame async while receiving information, an appropriate code search mode is desirably selected. Firstly, a controller of the pager checks to see if a bit sync indicating signal obtained from a bit synchronizer demonstrates bit sync. If the bit sync indicating signal indicates bit synchronization, the controller selects an operation mode for searching for synchronization code (SC). On the other hand, if the bit sync indicating signal indicates bit async, the controller selects a preamble code search mode. Accordingly, in the case where the pager becomes out of synchronism and immediately thereafter restores same during information acquisition, the pager is able to successfully obtain subsequent information by means of very simplified arrangement.

5 Claims, 7 Drawing Sheets

FIG. 6

METHOD OF SELECTING THE MOST DESIRABLE CODE SEARCH MODE IN A PAGER IN THE CASE OF FRAME ASYNC

BACKGROUND OF THE INVENTION

1. Field of the Invention

The present invention relates generally to a method of selecting an appropriate code search mode in a battery operated radio pager during data acquisition, and more specifically to such a method via which the most desirable code search mode is chosen when a pager falls into frame asynchronization or "frame async" while obtaining data. The present invention is able to attain an effective reduction of a pager hardware arrangement for controlling code search modes.

2. Description of Prior Art

Radio paging systems have proven very popular and many efforts have been made to reduce their size, weight, and power consumption through the use of integrated circuits.

In connection with power conservation, it is well known in the art to utilize battery saving circuits to minimize power consumption by periodically supplying power to high power drain circuitry in short bursts instead of continuously.

Presently known battery saving circuits operating in such a type of radio pager, periodically supply power to a front end (viz., a high frequency receiver section), enabling the search for the presence of a preamble code. If the preamble is detected, the front end is further energized for ascertaining an initial synchronization codeword (SC). Following this, if the first SC is detected (viz., frame sync is established), an address which follows the first SC is checked if it coincides with a subscriber's identification (ID) or unique word. In the case where the address coincides with the subscriber's ID, a message directed to the subscriber is acquired.

Before turning to the instant invention it is deemed advantageous to describe known techniques for selecting the most desirable pager's code search mode with reference to FIGS. 1 to 5B.

Figure 1:
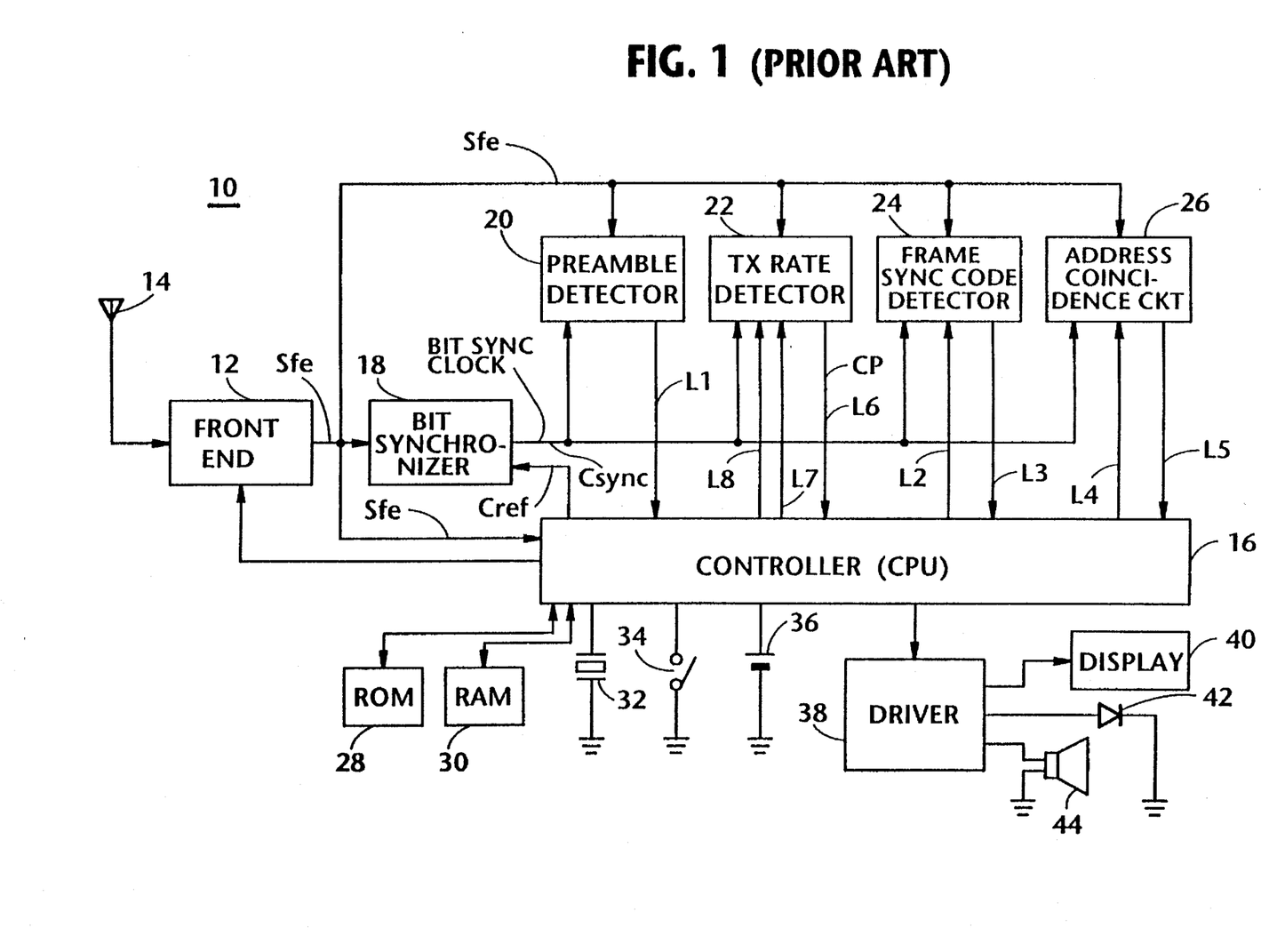
FIG. 1 is a block diagram schematically showing a known arrangement of a pager, referred to in the opening paragraphs of the instant disclosure.

FIG. 1 is a block diagram schematically showing a known arrangement of a battery operated radio pager 10.

In FIG. 1, a front end 12 is provided for amplifying and demodulating a code-modulated carrier wave received by an antenna 14. The front end 12 is comprised of a high frequency amplifier, a frequency converter, an IF (Intermediate Frequency) amplifier, and a discriminator (neither is shown). The front end 12 is periodically energized by a plurality of successive preamble search pulses which are applied thereto from a controller 16. The controller 16 usually takes the form of a central processing unit (CPU) and is arranged to control the overall operations of the pager 10.

The front end 12 is coupled, in addition to the controller 16, to a bit synchronizer 18, a preamble detector 20, a transmission (denoted by TX) rate detector 22, a frame sync code (SC) detector 24, and an address coincidence circuit 26.

As shown in FIG. 1, the bit synchronizer 18 is coupled to the blocks 16, 20, 22, 24 and 26, while the controller 16 is coupled to the blocks 20, 22, 24 and 26.

Further, the controller 16 is operatively coupled to a ROM (Read Only Memory) 28, a RAM (Random Access Memory) 30, an oscillator 32, a pager power switch 34, a battery 36, a driver 38, a display 40, a light source 42 such as a light emitting diode (LED), and a speaker 44. The ROM 28 is provided for storing a program which controls the overall operations of the pager 10, while the RAM 30 is used to define a work space required in connection with pager operations.

The operations of the pager 10 shown in FIG. 1 will be described with reference to FIGS. 2A–2B.

Figure 2A:
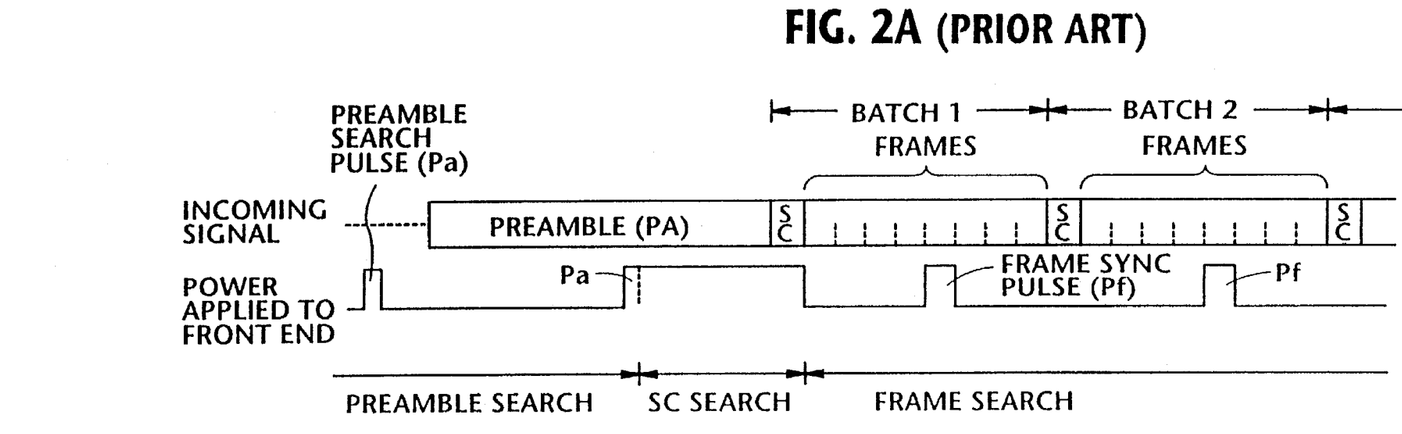
FIGS. 2A and 2B are diagrams depicting the code search operation modes of the arrangement shown in FIG. 1.

FIG. 2A is a schematic representation of an incoming signal and the power applied to the front end 12 from the controller 16. The incoming signal takes the form of a standard code format proposed by the POCSAG (British Post Office Standardization Advisory Group).

Although the present invention is not limited to such a code format, it is believed that a brief description thereof will facilitate a better understanding of this invention.

According to the POCSAG specification, a transmission consists of a preamble (PA) followed by a plurality of batches 1, 2, . . . each of which includes one synchronization code (SC) and eight (8) frames as shown in FIG. 2A. The transmission ceases when there are no further calls. Each transmission starts with a preamble to permit the recipient pager to attain bit synchronization. The preamble is a pattern of reversals, 101010 . . . , repeated for a period of at least 576 bits.

Although only two of preamble search pulses Pa are shown in FIG. 2A, it is well known in the art that the controller 16 continues to periodically supply pulses Pa until the preamble detector 20 (FIG. 1) detects a preamble.

As shown in FIG. 2A, it is assumed that the detector 20 (FIG. 1) has been able to specify a preamble during a preamble search mode at a pulse Pa (second occurrence in FIG. 2A). When the preamble detector 20 defines the preamble, the controller 16 is responsive to this (via a line L1) and extends power supply to the front end 12. Further, the controller 16 induces the frame sync code detector 24 (via a line L2 (FIG. 1)) to search for the SC which follows the detected preamble (viz., SC search mode). If the detector 24 ascertains the SC as in the case shown in FIG. 2A, the detector 24 advises the controller 16 of the detection of the SC via a line L3.

Following this, the controller 16 periodically supplies the front end 12 with a plurality of frame sync pulses Pf for acquiring data included in a predetermined frame of each batch (viz., frame search mode). Information which is indicative of the location of the data in the predetermined frame of each batch, has previously been stored in the ROM 28.

An address is transmitted in the first batch 1. If the address coincidence circuit 26 ascertains that the address located in the first batch 1 coincides with the subscriber's ID (which is applied thereto from the ROM 28 via a line L4), the circuit 26 informs the controller 16 of the address coincidence via a line L5. Subsequently, the controller 16 activates the driver 38 and alerts the subscriber using the speaker 44 and/or the LED 42. Further, the message received is exhibited on the display 40.

Figure 2B:
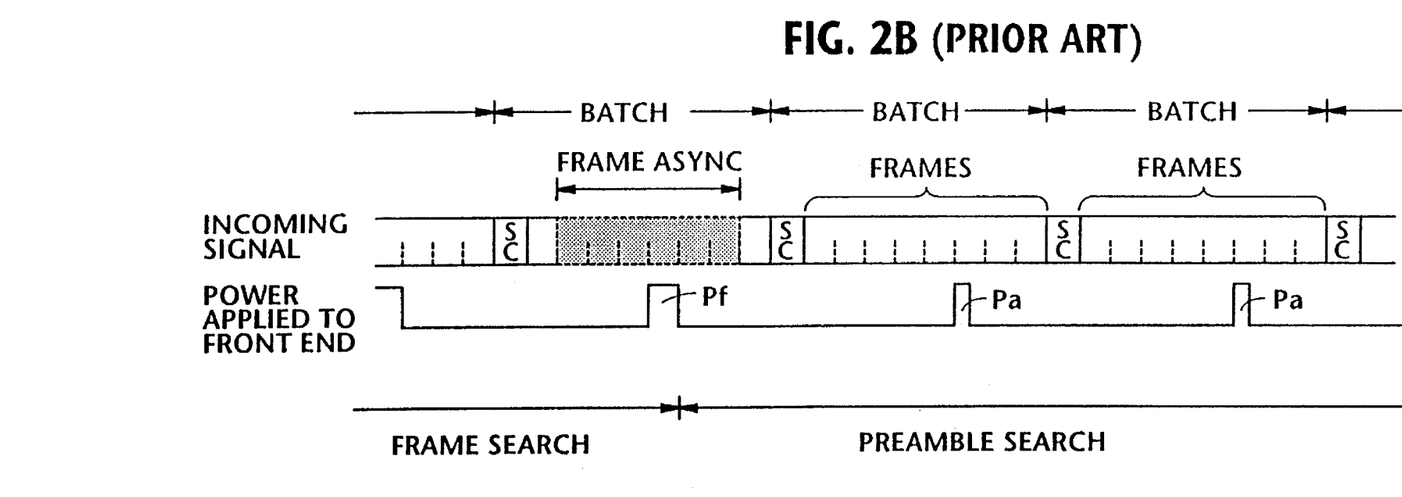

FIG. 2B is a diagram showing "frame async" which undesirably occurs in the incoming signal while the pager 10 acquires the message directed thereto. Further, FIG. 2B also shows the intermittent power supply to the front end 12.

Once the aforesaid frame async occurs during the message or data acquisition, the controller 16 fails to obtain the data during the frame sync pulse Pf. Thus, the controller 16 assumes that the incoming signal terminates. As a result, even if the frame sync is restored immediately after the frame sync pulse Pf, the controller 16 has already moved into the preamble search mode and thus, is applying preamble search pulses Pa to the front end 12 for detecting the next preamble as shown in FIG. 2B. This means that the pager 10 no longer acquires the complete data directed thereto.

In order to eliminate the above-mentioned problem, the pager 10 shown in FIG. 1 is provided with the transmission (TX) rate detector 22.

Figure 3:
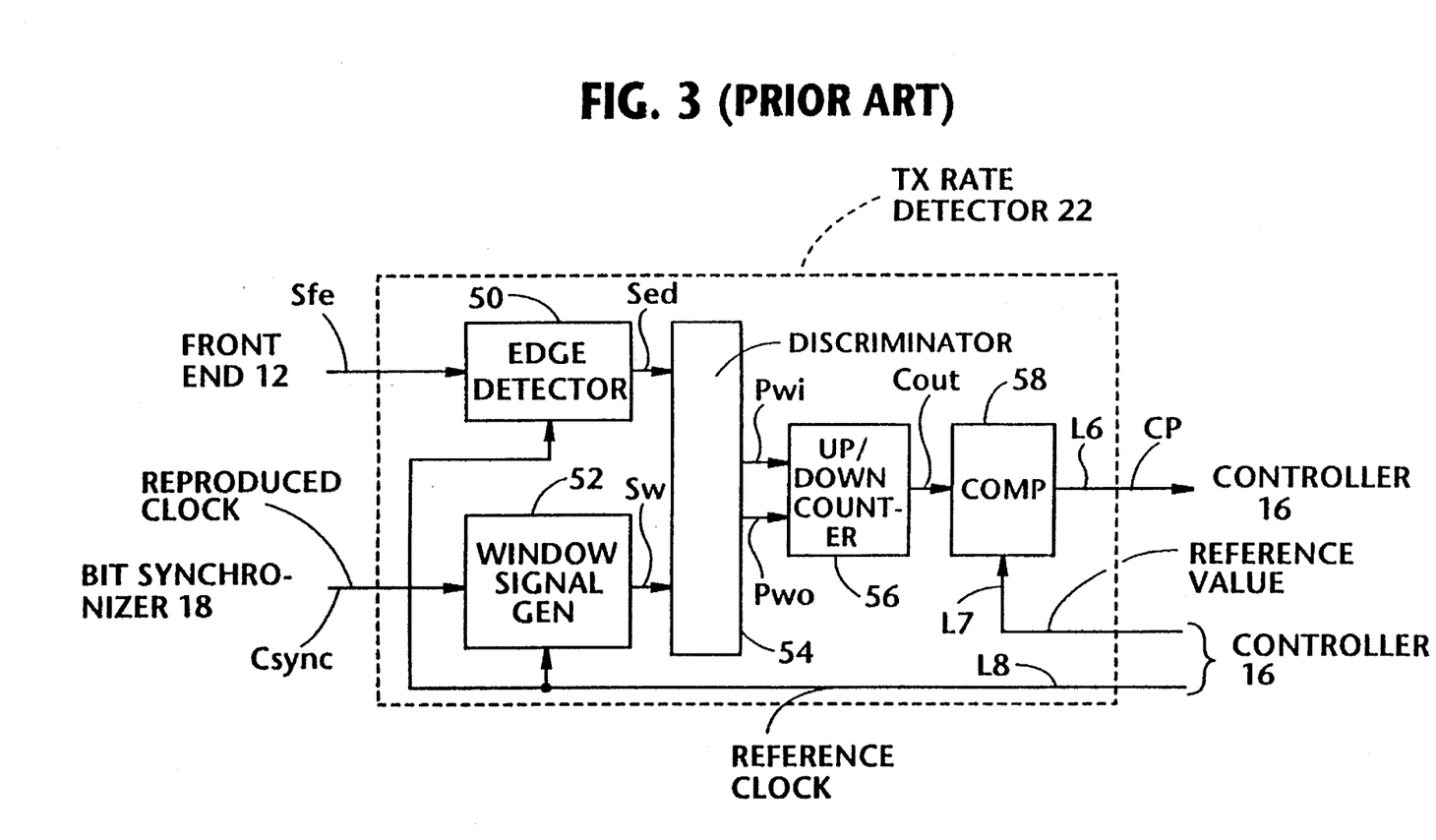
FIG. 3 is a block diagram showing in detail one block of the arrangement of FIG. 1.

FIG. 3 is a block diagram showing the arrangement of the TX rate detector 22 of FIG. 1.

As shown, the arrangement shown in FIG. 3 is provided with an edge detector 50, a window signal generator 52, a discriminator 54, an up/down counter 56, and a comparator 58, all of which are coupled as illustrated.

Figure 4:
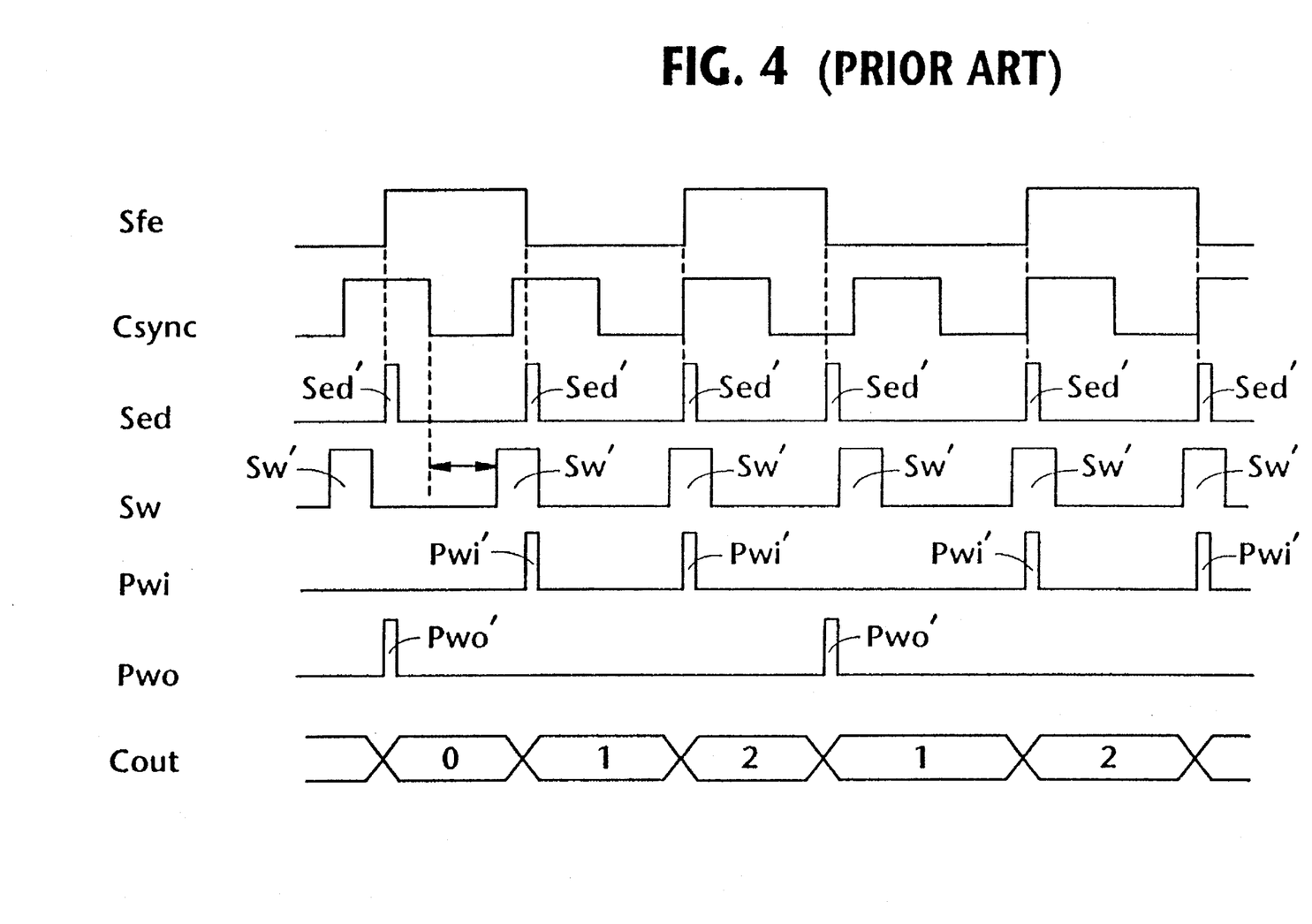
FIG. 4 is a timing chart depicting the operations which occur in the arrangement shown in FIG. 3.

The operations of the arrangement of FIG. 3 will be described with reference to timing charts depicted in FIG. 4.

The edge detector 50 is supplied with the demodulated digital signal Sfe from the front end 12 and outputs a signal Sed which includes a series of pulses Sed' each of which is generated at leading and trailing edges of the signal Sfe. The window signal generator 52 receives bit sync clock Csync from the bit synchronizer 18 and outputs a signal Sw which includes a series of window pulses Sw'. Each of the window pulses Sw' is produced by counting reference clocks applied thereto from the controller 16 after detecting the trailing edge of the bit sync clock Csync. The discriminator 54 outputs two signals Pwi and Pwo. More specifically, the discriminator 54 generates a pulse Pwi' if the edge pulse Sed' is generated within the window pulse Sw'. Contrarily, the discriminator 54 outputs a pulse Pwo' in the case where the edge pulse Sed' is generated outside of the window pulse Sw'. The pulses Pwi' and Pwo' thus generated are applied to the up/down counter 56.

The counter 56 operates such as to increase and decrease the content thereof in response to the pulses Pwi' and Pwo', respectively. The output of the counter 56 (denoted by Cout) is applied to the comparator 58 to which a reference value (eight (8) for example) is also applied from the controller 16.

When the output Cout of the counter 56 exceeds the reference value, the comparator 58 supplies the controller 16 (via a line L6) with the output thereof (denoted by CP) which in this instance assumes a logic 1 (for example). The controller 16 determines that the signal applied to the front end 12 is a calling signal if the output CP of the comparator 58 assumes a logic 1. Contrarily, if the output CP assumes a logic 0, the controller 16 determines that the signal applied to the pager is simply noise.

As shown in FIGS. 1 and 3, the controller 16 applies the above-mentioned reference value to the comparator 58 via a line L7, and also applies a reference clock to the blocks 50 and 52 via a line L8. Further, the controller 16 applies a bit sync reference signal Cref to the bit synchronizer 18.

Figure 5A:
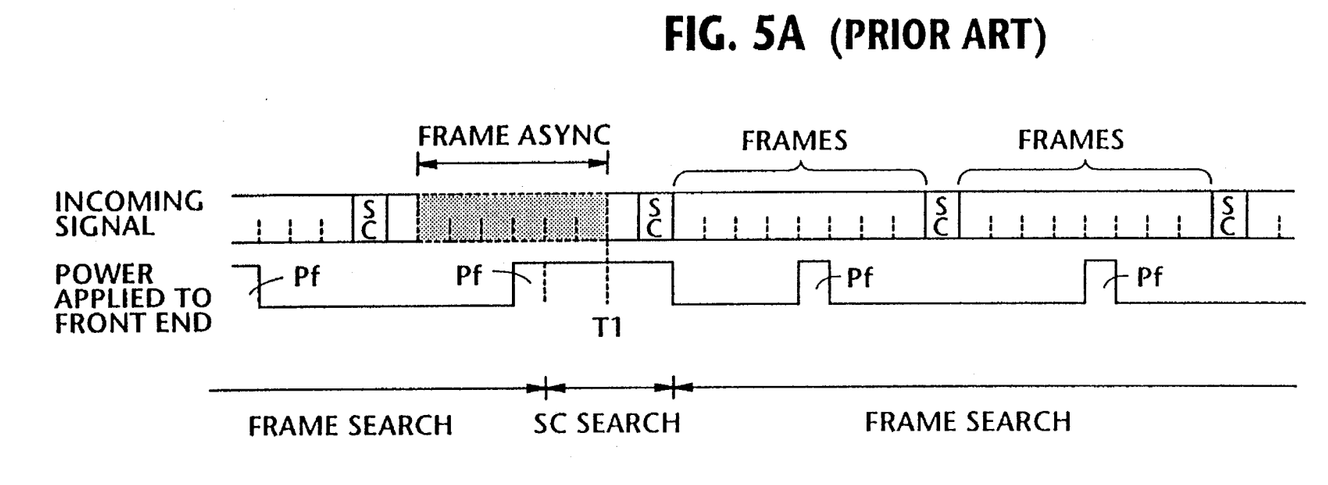
FIGS. 5A and 5B are diagrams which demonstrate the code search modes of the arrangement of FIG. 1.

Reference is made to FIG. 5A. In the event that the controller 16 (FIG. 1) is informed of frame async from the detector 24 (see FIG. 2B) while the pager 10 receives a message, the controller 16 examines the output CP of the comparator 58. If the output CP assumes a logic 1, this means that the pager 10 is still receiving the message. Therefore, as shown in FIG. 5A, the controller 16 extends the power supply to the front end 12 (viz., the pager 10 enters into the SC search mode). If the frame async terminates at a time point T1, the controller 16 is able to restore frame sync using the following SC. Thus, the pager 10 is able to obtain the complete message directed thereto using the subsequent frame sync pulses Pf as shown in FIG. 5A.

Figure 5B:
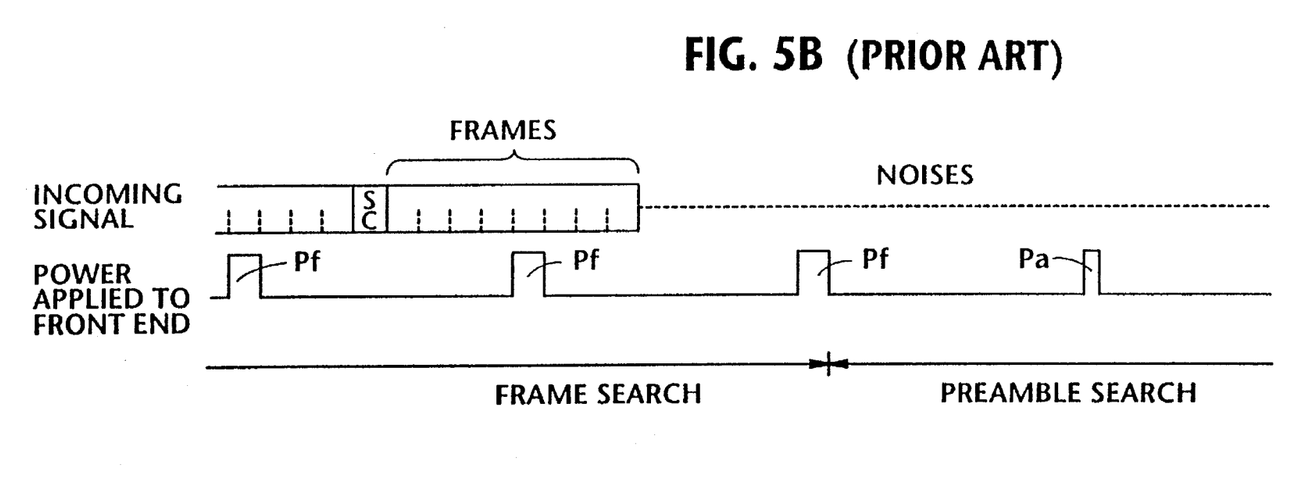

On the other hand, if the output CP assumes a logic 0 during the frame search mode, the controller 16 determines that the incoming signal terminates and the pager 10 is now receiving noise. In this case, the controller 16 moves into the preamble search mode as best shown in FIG. 5B.

As mentioned above, the known arrangement of FIG. 1 inevitably requires the transmission (TX) detector 22 for implementing the aforesaid code mode selection. However, it is highly desirable to omit the detector 22 for the purposes of reducing the paper's size, weight, and power consumption in addition to simplifying the arrangement.

SUMMARY OF THE INVENTION

It is an object of the present invention to provide a method of selecting the most desirable code search mode when a pager falls into "frame async" during data acquisition without the need for the circuitry which is dedicated to the above-mentioned mode selection.

It is another object of the present invention to provide a method of selecting the most desirable code search mode when a pager falls into "frame async" during data acquisition without the use of the transmission rate detector of the prior art.

In brief, the above object is achieved by a method wherein in the event that a radio pager falls into frame async while receiving information, an appropriate code search mode is desirably selected. Firstly, a controller of the pager checks to see if a bit sync indicating signal obtained from a bit synchronizer demonstrates bit sync. If the bit sync indicating signal indicates bit synchronization, the controller selects an operation mode for searching for synchronization code (SC). On the other hand, if the bit sync indicating signal indicates bit async, the controller selects a preamble code search mode. Accordingly, in the case wherein synchronism is lost and then immediately thereafter is restored during information acquisition, the pager is able to successfully obtain subsequent information by means of a very simplified arrangement.

An important aspect of the present invention resides in a method of selecting a code search mode of a radio pager when the pager falls into frame async while receiving information, the pager including a bit synchronizer which generates a clock in synchronism with bits of an incoming signal, the method comprising the steps of: (a) checking to see if a bit sync indicating signal obtained from the bit synchronizer demonstrates bit sync at the bit synchronizer; (b) selecting a synchronization code search mode if the bit sync indicating signal demonstrates the bit sync; and (c) selecting a preamble code search mode if the bit sync indicating signal demonstrates bit async.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 6:
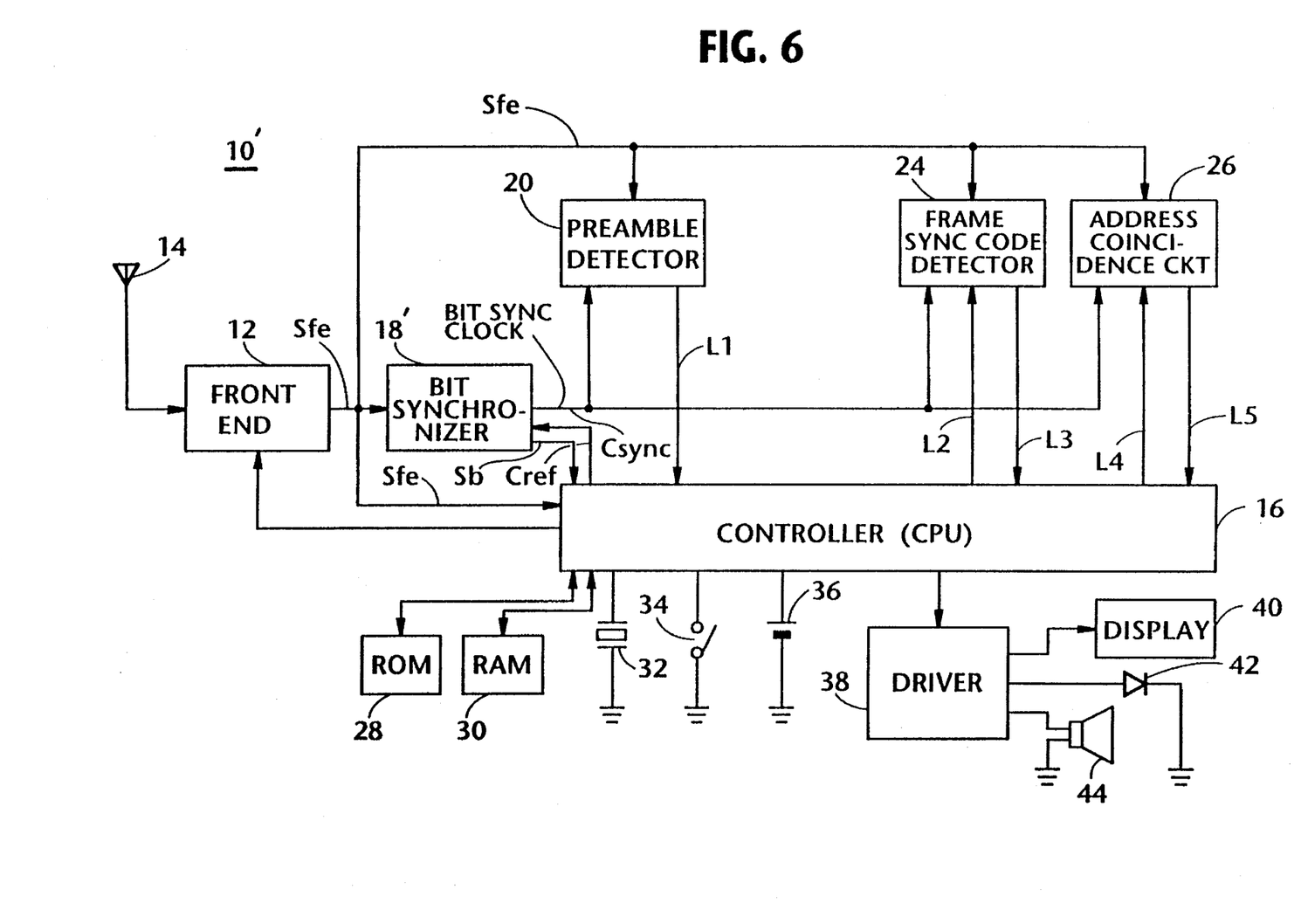
FIG. 6 is a block diagram schematically showing an arrangement of a pager to which the present invention is applicable.

Reference is now made to FIG. 6, wherein a pager 10' embodying the instant invention is schematically illustrated in block diagram form.

The arrangement of FIG. 6 differs from that of FIG. 1 in that the former arrangement is not provided with the transmission (TX) rate detector 22. Other than this, the arrangement of FIG. 6 is essentially the same as that shown in FIG. 1.

In order to effectively achieve the above-mentioned code search mode selection upon the pager 10' falling into "frame async" during receiving a message, a bit synchronizer 18' applies a bit sync indicating signal $S^b$ to the controller 16.

Figure 7:
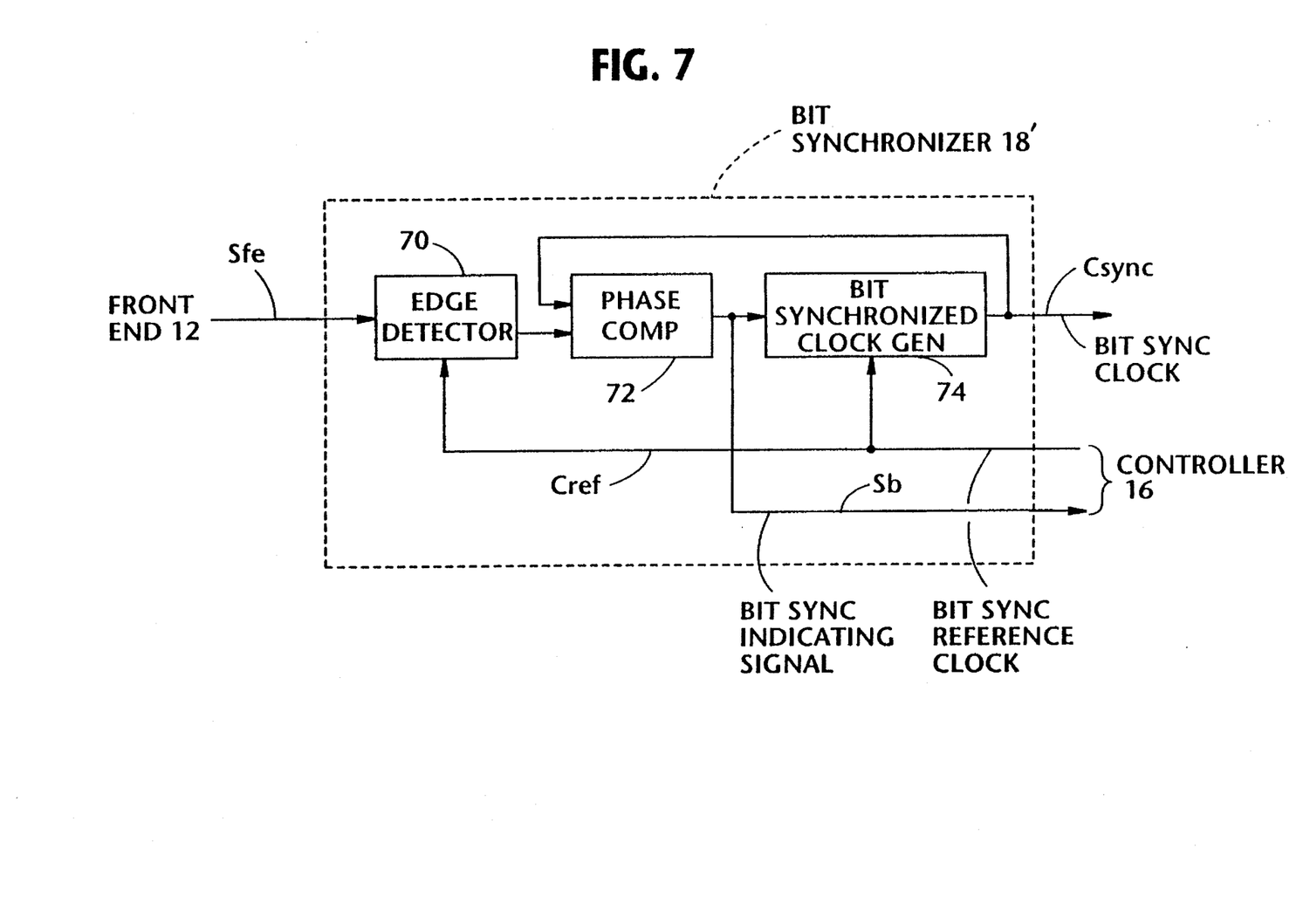
FIG. 7 is a block diagram showing one block of FIG. 6 which is pertinent to the present invention.

FIG. 7 is a block diagram showing the arrangement of the bit synchronizer 18' which is pertinent to the present invention.

As shown in FIG. 7, the bit synchronizer 18' includes an edge detector 70, a phase comparator 72, and a bit synchronized clock generator 74. The controller 16 applies the bit sync reference clock (denoted by Cref) to the edge detector 70 and the bit synchronized clock generator 74. The reference clock Cref is 16,384 Hz (512 Hz=32) for example. The bit synchronized clock generator 74 takes the form of variable frequency divider and produces a bit synchronized clock of 512 Hz when bit sync is established.

The edge detector 70 is essentially identical to the edge detector 50 of FIG. 3 and produces a series of pulses each of which has a predetermined pulse width and which is generated at each of the leading and trailing edges of the demodulated digital signal Sfe.

The edge indicating pulses outputted from the edge detector 70, are applied to the phase comparator 72 which is supplied with the bit sync clock Csync from the clock generator 74.

In the case where a calling signal such as shown in FIG. 2A is applied to the front end 12, the phase difference detected at the phase comparator 72 is gradually reduced due to the feedback loop including the blocks 72 and 74. When the bit synchronization is established, the bit sync indicating signal Sb exhibits zero value in that the phase difference in the output of the phase comparator 72 is rendered zero.

When the preamble detector 20 ascertains a preamble, the bit synchronizer 18' has established bit sync. It is assumed that the pager 10' enters into the frame search mode after completing the above-mentioned SC search mode.

During the frame search mode, if the controller 16 detects "frame async" as mentioned above in connection with FIG. 2B, the bit sync indicating signal Sb no longer indicates "zero value". This is because the synchronized state of the pager 10' implies "bit async" at the bit synchronizer 18'. In this case, if the controller 16 detects the bit sync recovery by monitoring the bit sync indicating signal Sb, the controller 16 extends the supply of power to the front end 12. Thus, the frame sync code detector 24 is able to search for a SC (viz., SC search mode) as mentioned in connection with FIG. 2A. On the other hand, if the controller 16 detects that the bit sync is not restored, the controller 16 applies a series of preamble search pulses Pa as discussed regarding FIG. 2B (this means that the paper 10' enters into the preamble search mode).

The bit synchronizer 18' itself is known in the art except that the bit sync indicating signal is used for the above-mentioned best mode selection when the pager falls into frame async.

As seen from the foregoing, the present invention can be considered simple. However, it effectively reduces the pager's size, weight, and power consumption and simplifying the arrangement.

It will be understood that the above disclosure is representative of only one possible embodiment and that various modifications can be made without departing from the concept of the instant invention.

What is claimed is:

1. A method of selecting between a preamble search mode and a frame search mode when a pager falls into frame asynchronization during said frame search mode, said pager including a front end, a bit synchronizer and a controller, said bit synchronizer being coupled to said front end and said controller and generating a clock in synchronism with bits of an incoming signal applied thereto from said front end, said method comprising the steps of:

(a) determining, at said controller, that said bit synchronizer has gone out of bit synchronization;

(b) selecting said frame search mode, by periodically issuing frame synchronization pulses from said controller, when said bit synchronizer immediately restores the bit synchronization; and (c) selecting said preamble search mode, by periodically applying preamble search pulses to said front end from said controller, when said bit synchronizer fails to immediately restore the bit synchronization.

2. A method as claimed in claim 1, wherein said bit synchronizer includes:

a first device which produces a series of pulses, each of which being generated at leading and trailing edges of said incoming signal;

a second device which is coupled to said first device and receives said series of pulses therefrom, said second device generating an output indicative of a phase difference between each of said pulses and said clock which is to be synchronized with said bits of said incoming signal; and a third device which receives said output of said second device and generates said clock, said third device feeding back said clock to said second device; and wherein said controller receives said output of said second device and selects between said preamble search mode and said frame search mode based on said output.

3. A method as claimed in claim 1, further comprising the steps of:

producing a series of pulses, each of which being generated at leading and trailing edges of said incoming signal;

a first step of generating an output indicative of a phase difference between each of said pulses and said clock which is to be synchronized with said bits of said incoming signal; and a second step of generating said clock based on said output generated in said receiving step and generating said clock; and wherein:

said frame search mode selecting step includes the step of determining, based on said output signal, that said bit synchronizer immediately restores the bit synchronization; and said preamble search mode selecting step includes the step of determining, based on said output signal, when said bit synchronizer fails to immediately restore the bit synchronization.

4. A pager for selecting between a preamble search mode and a frame search mode when said pager falls into frame asynchronization during said frame search mode, said pager comprising:

a front end;

a controller; and a bit synchronizer coupled to said front end and said controller which generates a clock in synchronism with bits of an incoming signal applied thereto from said front end;

said controller performing the following functions:
determining that said bit synchronizer has gone out of bit synchronization;
selecting said frame search mode, by periodically issuing frame synchronization pulses to said front end, when said bit synchronizer immediately restores the bit synchronization; and
selecting said preamble search mode, by periodically applying preamble search pulses to said front end, when said bit synchronizer fails to immediately restore the bit synchronization.

5. A pager as claimed in claim 4, wherein said bit synchronizer includes:

a first device which produces a series of pulses, each of which being generated at leading and trailing edges of said incoming signals;

a second device which is coupled to said first device and receives said series of pulses therefrom, said second device generating an output indicative of a phase difference between each of said pulses and said clock which is to be synchronized with said bits of said incoming signal; and a third device which receives said output of said second device and generate said clock, said third device feeding back said clock to said second device;

wherein said controller receives the output of said second device and selects between said preamble search mode and said frame search mode based on this said output.

* * * * *

UNITED STATES PATENT AND TRADEMARK OFFICE
CERTIFICATE OF CORRECTION

PATENT NO. : 5,526,379
DATED : June 11, 1996
INVENTOR(S) : Hiroyasu KURAMATSU

It is certified that error appears in the above-indentified patent and that said Letters Patent is hereby corrected as shown below:

Column 5, line 35, delete "(512 Hz = 32)" and insert --(512 Hz x 32)--.

Column 6, delete lines 21-38 (claim 1) and insert the following:

--1. A method of selecting between a preamble search mode and a frame search mode when a pager falls into frame asynchronization during said frame search mode, said pager including a front end, a bit synchronizer and a controller, said bit synchronizer being coupled to said front end and said controller and generating a clock in synchronism with bits of an incoming signal applied thereto from said front end, said method comprising the steps of:

(a) determining, at said controller, that said bit synchronizer has gone out of bit synchronization by comparing a phase of a signal, which is produced based on said incoming signal, to a phase of said clock, and providing an output signal indicative of the determination;

(b) selecting said frame search mode, by periodically issuing frame synchronization pulses from said controller, when said bit synchronizer immediately restores the bit synchronization as indicated by said output signal; and (c) selecting said preamble search mode, by periodically applying preamble search pulses to said front end from said controller, when said bit synchronizer fails to immediately restore the bit synchronization as indicated by said output signal. --

UNITED STATES PATENT AND TRADEMARK OFFICE
CERTIFICATE OF CORRECTION

PATENT NO. : 5,526,379
DATED : June 11, 1996
INVENTOR(S) : Hiroyasu KURAMATSU

It is certified that error appears in the above-indentified patent and that said Letters Patent is hereby corrected as shown below:

Column 6, delete lines 39-55 and insert the following:

--2. A method as claimed in claim 1, wherein said bit synchronizer incudes:

a first device which produces said signal which includes a series of pulses, each of which being generated at leading and trailing edges of said incoming signal;

a second device which is coupled to said first device and receives said series of pulses therefrom, said second device generating said output indicative of a phase difference between each of said pulses and said clock which is to be synchronized with said bits of said incoming signal; and a third device which receives said output of said second device and generates said clock, said third device feeding back said clock to said second device; and wherein said controller receives said output of said second device and selects between said preamble search mode and said frame search mode based on said output. --

UNITED STATES PATENT AND TRADEMARK OFFICE
CERTIFICATE OF CORRECTION

PATENT NO. : 5,526,379
DATED : June 11, 1996
INVENTOR(S) : Hiroyasu KURAMATSU

It is certified that error appears in the above-indentified patent and that said Letters Patent is hereby corrected as shown below:

Column 6, delete lines 56-67, and column 7, delete lines 1-8, and insert the following:

--3. A method as claimed in claim 1, further comprising the steps of:

producing said signal which includes a series of pulses, each of which being generated at leading and trailing edges of said incoming signal;

a first step of generating said output indicative of a phase difference between each of said pulses and said clock which is to be synchronized with said bits of said incoming signal; and a second step of generating said clock based on said output generated in said receiving step and generating said clock. --

UNITED STATES PATENT AND TRADEMARK OFFICE
CERTIFICATE OF CORRECTION

PATENT NO. : 5,526,379
DATED : June 11, 1996
INVENTOR(S) : Hiroyasu KURAMATSU

It is certified that error(s) appears in the above-identified patent and that said Letters Patent is hereby corrected as shown below:

Column 7, delete lines 9-25, and column 8, delete lines 1-5, and insert the following:

--4. A pager for selecting between a preamble search mode and a frame search mode when said pager falls into frame asynchronization during said frame search mode, said pager comprising:

a front end;

a controller; and a bit synchronizer, coupled to said front end and said controller, which generates a clock in synchronism with bits of an incoming signal applied thereto from said front end and produces a signal based on said incoming signal, said bit synchronizer determining that said bit synchronizer has gone out of bit synchronization by comparing a phase of said signal with a phase of said clock, and providing an output signal indicative of said determination;

said controller performing the following functions:

selecting said frame search mode, by periodically issuing frame synchronization pulses to said front end, when said bit synchronizer immediately restores the bit synchronization as indicated by said output signal; and selecting said preamble search mode, by periodically applying preamble search pulses to said front end, when said bit synchronizer fails to immediately restore the bit synchronization as indicated by said output signal. --

UNITED STATES PATENT AND TRADEMARK OFFICE
CERTIFICATE OF CORRECTION

PATENT NO. : 5,526,379
DATED : June 11, 1996
INVENTOR(S) : Hiroyasu KURAMATSU

It is certified that error appears in the above-indentified patent and that said Letters Patent is hereby corrected as shown below:

Column 8, delete lines 6-22 and insert the following:

--5. A pager as claimed in claim 4, wherein said bit synchronizer includes:

a first device which produces said signal which includes a series of pulses, each of which being generated at leading and trailing edges of said incoming signals;

a second device which is coupled to said first device and receives said series of pulses therefrom, said second device generating said output indicative of a phase difference between each of said pulses and said clock which is to be synchronized with said bits of said incoming signal; and a third device which receives said output of said second device and generate said clock, said third device feeding back said clock to said second device. --

Signed and Sealed this

Twenty-ninth Day of October 1996

Attest:

BRUCE LEHMAN

*Attesting Officer*     *Commissioner of Patents and Trademarks*